(12) United States Patent
Kang et al.

(10) Patent No.: US 6,552,973 B1
(45) Date of Patent: Apr. 22, 2003

(54) APPARATUS AND METHOD FOR SERVO CONTROL IN AN OPTICAL DISK DRIVER

(75) Inventors: Byung-Gyoo Kang, Kyungki-do (KR); Jeong-Chae Youn, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,501

(22) Filed: Aug. 20, 1999

(30) Foreign Application Priority Data

Aug. 21, 1998 (KR) .............................................. 98-34334
Oct. 7, 1998 (KR) .............................................. 98-42468

(51) Int. Cl.$^7$ ................................................ G11B 7/00
(52) U.S. Cl. ................................ 369/44.32; 369/53.14; 369/53.19
(58) Field of Search ........................... 369/44.11, 44.28, 369/44.27, 44.29, 44.32, 44.34, 47.1, 53.1, 53.11, 53.14, 53.15, 53.19

(56) References Cited

U.S. PATENT DOCUMENTS 5,896,354 A * 4/1999 Yamashita et al. ....... 369/44.34
6,118,739 A * 9/2000 Kishinami et al. ....... 369/44.28

* cited by examiner

Primary Examiner—Muhammad Edun
(74) Attorney, Agent, or Firm—Birch, Stewart, Kolasch & Birch, LLP

(57) ABSTRACT

An apparatus and method for servo control in an optical disk driver. The amount of disk eccentricity is measured, and a compensation value corresponding to the measured disk eccentricity is calculated and stored. The stored compensation value is used in the track search mode so that a more stable and precise track search operation is achieved despite the disk eccentricity caused by imperfect disk manufacturing processes or disk clamping errors. Also, when a track jump is requested during a track-following operation, the jump start point is adjusted properly, thereby reducing the time needed to complete the track jump operation, as well as reducing track jump errors.

15 Claims, 9 Drawing Sheets

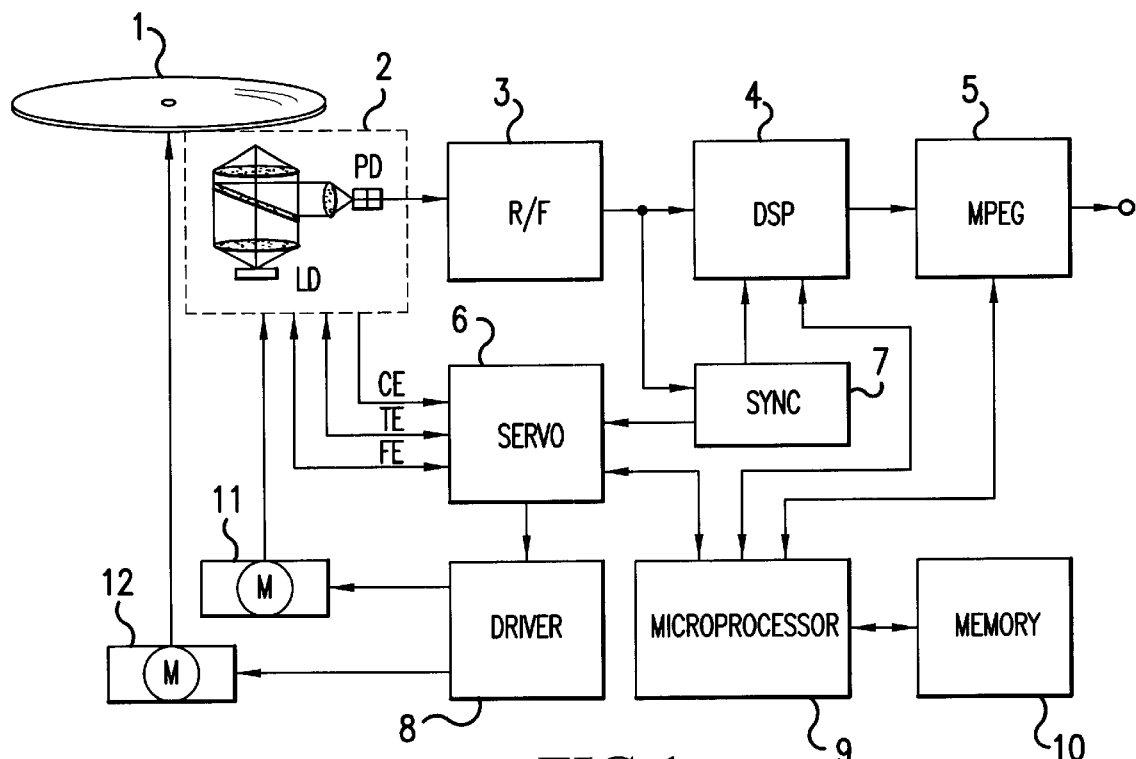
FIG.1
CONVENTIONAL ART
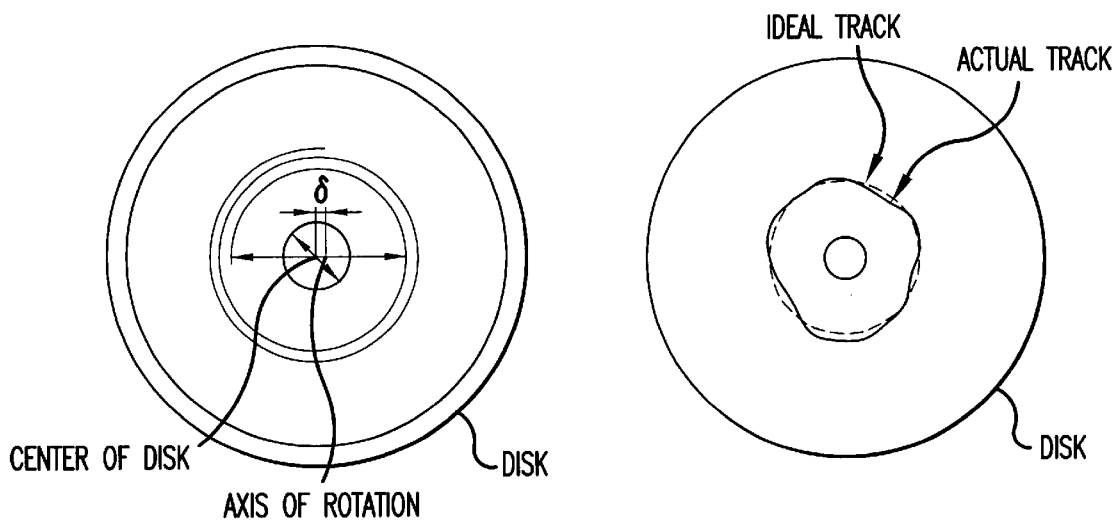
FIG.2(a)
CONVENTIONAL ART
FIG.2(b)
CONVENTIONAL ART

APPARATUS AND METHOD FOR SERVO CONTROL IN AN OPTICAL DISK DRIVER

BACKGROUND OF THE INVENTION

1. Field of the Invention

The present invention relates to an apparatus and method for servo control of an optical disk driver, and more particularly, but not by way of limitation, to a servo control apparatus and method capable of an optical disk driver compensating for eccentric rotation of the disk.

2. Description of the Related Art

Shown in FIG. 1 is a general optical disk player, including an optical pickup 2 for reproducing signals from an optical disk 1, an R/F unit 3 for equalizing and shaping the RF signals reproduced from optical disk 1 by pickup 2, and a synchronization unit 7 for creating a clock signal whose phase is synchronized with the binary data outputted from R/F unit 3. The disk player also includes a digital signal processing unit 4 for processing the binary data stream received from R/F unit 3 in order to retrieve digital data using the synchronization clock, an MPEG decoder 5 for decoding the retrieved digital data to obtain original picture or audio data, and a sled motor 11 for moving optical pickup 2. The disk player further includes a spindle motor 12 for rotating optical disk 1, a driver for driving sled motor 11 and spindle motor 12, and a servo unit 6 for controlling optical pickup 2 and driver 8. A microprocessor 9 supervises overall operations of servo unit 6 and digital signal processing unit 4, and a memory 10 stores data necessary for microprocessor 9.

In the optical disk player, when optical disk 1 is inserted into a disk tray, optical disk 1 is clamped by a clamping device. Then, controlled by servo unit 6, the driver 8 provides electric current to rotate the spindle motor 11, and maintains the rotation velocity of optical disk 1 constant, at about 2,500 rpm.

To reproduce signals recorded on optical disk 1, optical pickup 2, with a laser diode LD and photo diodes PD installed in it, forms a laser beam spot on the recording layer of optical disk 1 by irradiating a laser beam emitted from the laser diode LD. The laser beam reflected from optical disk 2 is collected by the photo diodes PD and converted into electric signals. R/F unit 3 equalizes and shapes the electric signals to produce binary data, and digital signal processing unit 4 performs the processing of the binary data. The synchronization clock necessary for digital signal processing unit 4, synchronized with the binary data from R/F unit 3, is provided by synchronization unit 7.

The basic role of sled motor 11 is to move optical pickup 2 in the radial direction. Controlled by servo unit 6, sled motor 11 moves optical pickup 2 rapidly in the radial direction in the track search mode for locating a desired track. If the track search mode is set by a user's request, microprocessor 9 detects the position of the track which optical pickup 2 is currently accessing, calculates the distance between the present track and destination track, and issues a command to move optical pickup 2 to the destination track by jumping the calculated distance.

In the aforementioned track search operation, the distance that optical pickup 2 should jump is calculated on the condition that the center of the objective lens in optical pickup 2 coincides with the optical axis. In reality, however, this condition is not usually satisfied since the objective lens is suspended from the tracking actuator, and can move within a certain range amounting to 200–300 tracks. Hence, unless the movement of the objective lens is taken into consideration, the desired track cannot be reached, even though optical pickup 2 jumps exactly the calculated distance.

As shown in FIG. 2(a), because of disk clamping errors, the center of the disk does not usually coincide with the axis of disk rotation, which creates eccentric rotation of the disk. Also, owing to imperfect disk manufacturing processes as shown FIG. 2(b), the tracks formed on the disk are not ideal spirals. This causes distortions in reproduced signals.

Due to the eccentric rotation of the disk caused by disk clamping errors and imperfect disk manufacturing processes, the destination track repeatedly moves inward and outward with respect to optical pickup 2 as the disk rotates. This makes the task of jumping to the destination track difficult and causes track jump errors.

If a pause mode is set while track-following control is being performed, each time the disk rotates one revolution, the optical beam spot is controlled to move 1 track inward so that the beam spot remains on the desired track. In the case where the beam spot deviates from the track center as at points (a) or (c) shown in FIGS. 3 and 4, it may take a longer time for the beam spot to settle in the destination track, or the track jump may fail.

SUMMARY OF THE INVENTION

It is an object of the present invention to provide a method for servo control of an optical disk driver, capable of measuring the amount of disk eccentricity caused by imperfect disk manufacturing processes or disk clamping errors, and capable of compensating for the disk eccentricity with the result that stable track search operations are guaranteed.

Accordingly, the present invention is directed to a method and apparatus that substantially obviate one or more of the problems due to limitations and disadvantages of the related art.

In accordance with the purpose of the invention, as embodied and broadly described, one aspect of the invention includes detecting an amount of disk eccentricity from a main beam reflected from an optical disk; setting compensation values corresponding to the detected amount of disk eccentricity; and adjusting a number of tracks to be crossed during a track jump operation using the compensation values.

In another aspect, the invention includes detecting an amount of misalignment between a center of an objective lens and an optical axis of a photodetector; calculating a value used to move an optical pickup to a destination track; and adjusting the calculated value based on the detected amount of misalignment.

In still another aspect, the invention includes detecting a tracking error signal from an optical disk; and determining when to move the beam spot based on the tracking error signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 1 is a block diagram of a general optical disk reproducing apparatus;

FIGS. 2(a) and 2(b) are examples illustrative of main causes of disk eccentricity;

DETAILED DESCRIPTION OF THE PREFERRED EMBODIMENTS

In order that the invention may be fully understood, preferred embodiments thereof will now be described with reference to the accompanying drawings.

Figure 3:
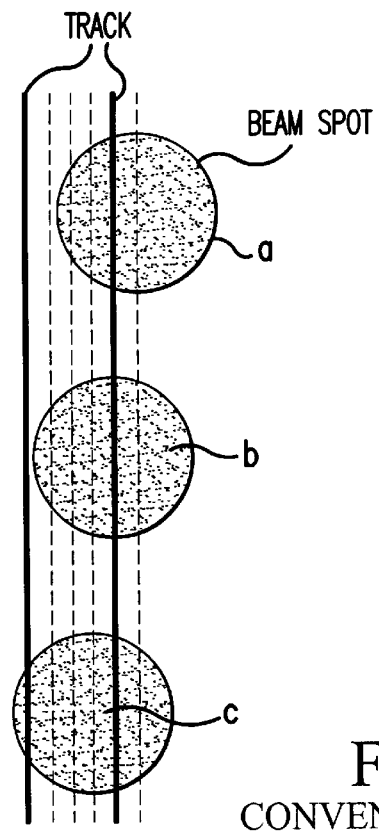
FIG. 3 is a view showing several positions of the laser beam spot with respect to the data track.
Figure 4:
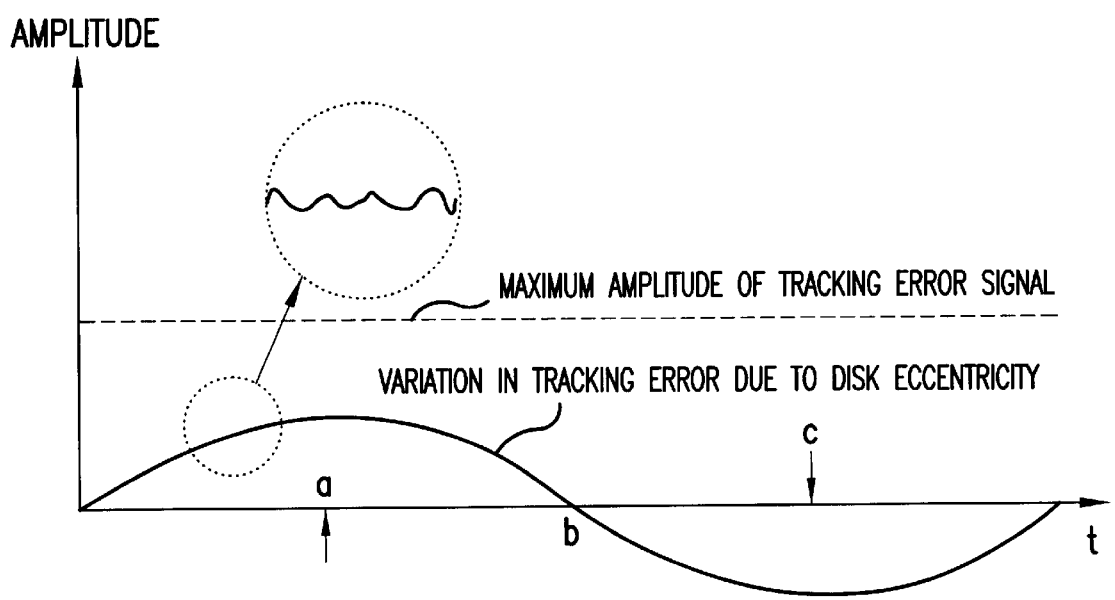
FIG. 4 is a tracking error signal created at each position of the laser beam spot shown in FIG. 3.
Figure 5:
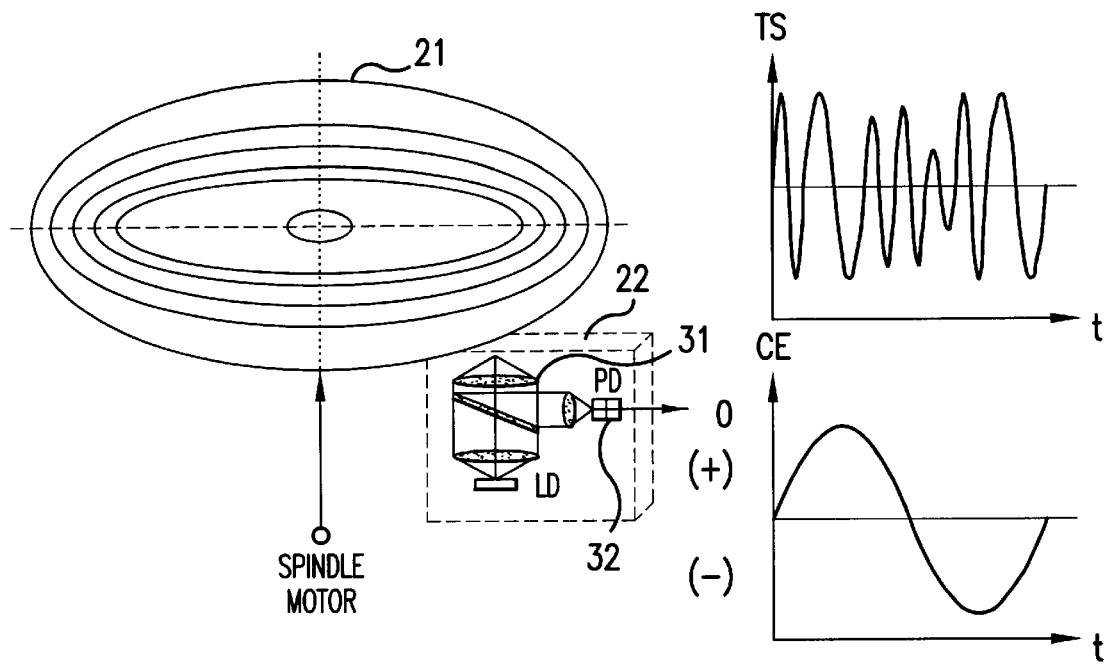
FIG. 5 is a schematic diagram illustrative of the process for measuring the amount of disk eccentricity in accordance with the present invention.

FIG. 5 illustrates the process of measuring the amount of disk eccentricity. After an optical disk is inserted into a disk tray, the disk rotates at a constant angular velocity. With only focusing control activated (i.e., sled motor and tracking servo disabled), the amount of disk eccentricity caused by the aforementioned reasons can be detected by measuring a center error signal CE and a track traverse signal or tracking error signal TS, generated from the disk.

Figures 6A, 6B, 6C:
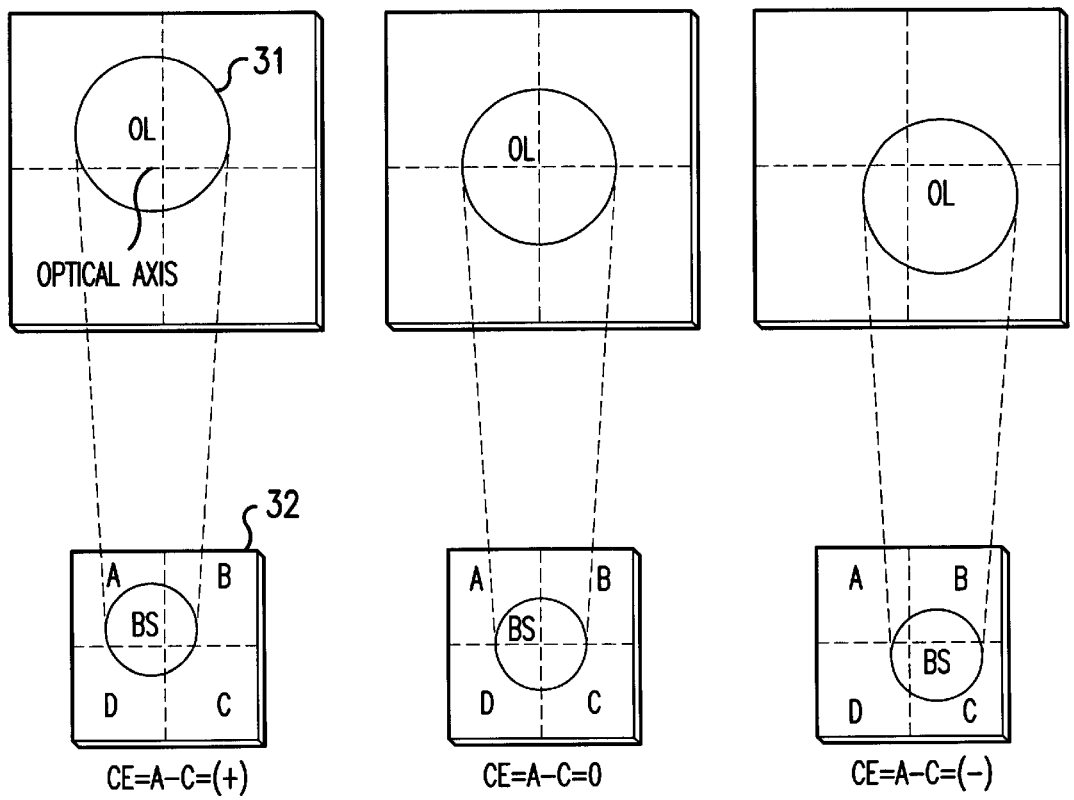
FIGS. 6(a), 6(b) and 6(c) are schematic diagrams illustrative of the principle of detecting the center error signal.

FIGS. 6(a)–6(c) illustrate the principle of detecting the center error signal, wherein the laser beam reflected from the optical disk is collected by photo diodes 32, after passing through an objective lens 31.

Since objective lens 31 is designed to move within a certain range with respect to the optical axis of the photo diodes by means of a tracking actuator, the laser beam spot is capable of precisely following a data track in the track-following mode by moving objective lens 31, despite the presence of disk eccentricity.

Since the operating range of objective lens 31 amounts to about 200–300 tracks, the center of objective lens 31 is likely to deviate from the optical axis when a track jump command is issued. For precise track search operations, therefore, the amount of the misalignment between the center of objective lens 31 and the optical axis should be taken into consideration, as well as the distance between the currently accessed track and the destination track. The center error signal CE is obtained by subtracting the output of photodetector C from the output of photodetector A. The tracking error or traverse signal is obtained by (A+D)−(B+C).

Unless the amount of the misalignment between objective lens 31 and the optical axis is considered, precise track jump operations are not attainable. This is because the track where the laser beam spot arrives after the jump operation is not the destination track, though the optical pickup jumps exactly the calculated distance.

In the present invention, the amount of disk eccentricity is measured and a compensation value corresponding to the measured disk eccentricity is calculated and stored. The compensation value is used in the track search mode, with the result that track jump errors can be minimized.

The method for servo control of an optical disk driver according to the present invention will be explained in detail with reference to the accompanying drawings.

Figure 7:
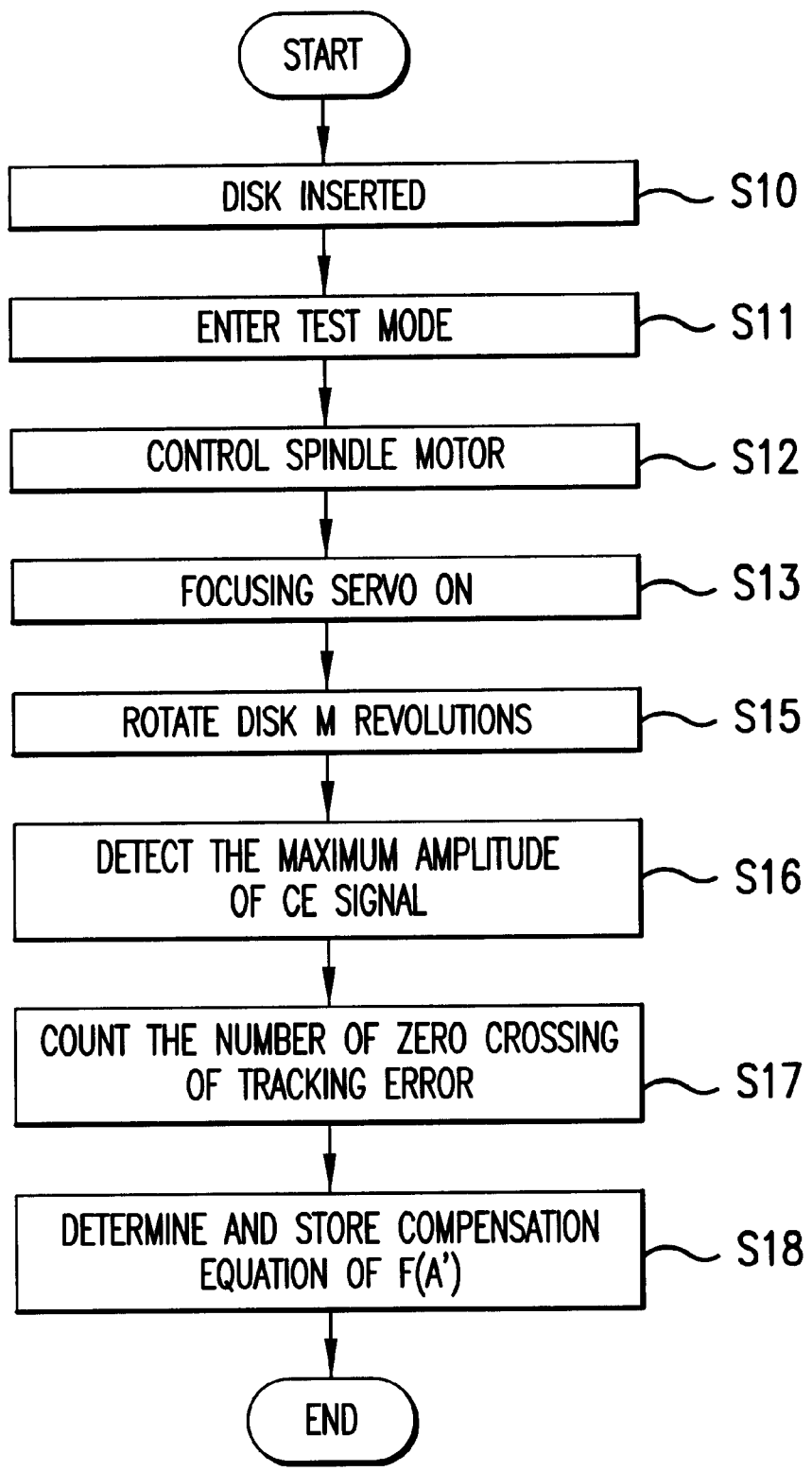
FIG. 7 is a flow diagram of the method for yielding the compensation value corresponding to disk eccentricity according to an embodiment of the present invention.
Figure 8:
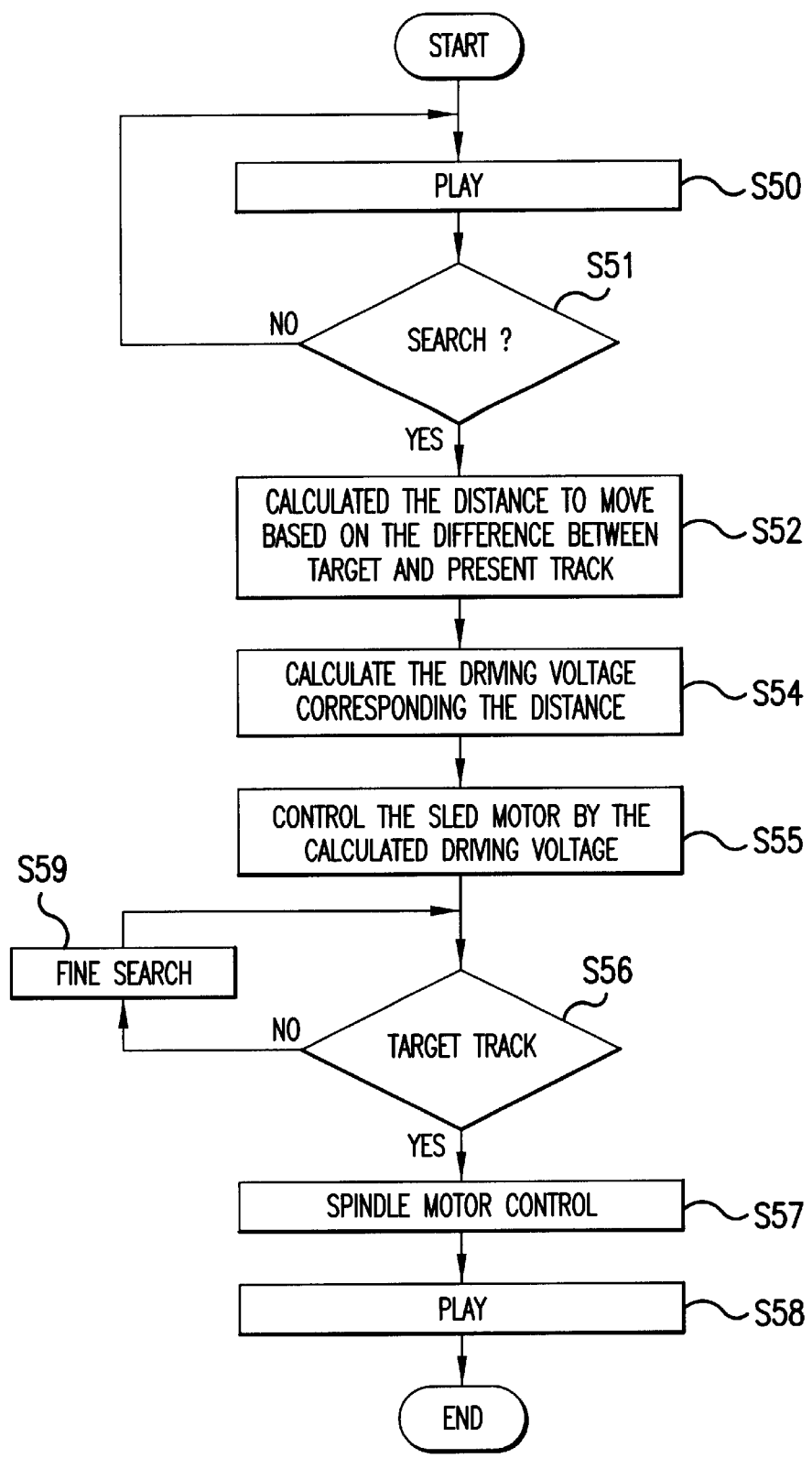
FIG. 8 is a flow diagram of the track jump operation according to an embodiment of the present invention.

FIGS. 7 and 8 are flow diagrams of the method for obtaining the compensation value and for the track jump method using the compensation value.

As shown in FIG. 7, if an optical disk is inserted into a disk tray of an optical disk player, the optical disk is clamped by a clamping device installed in the optical disk player (S10). Then, the test mode is set for measuring the amount of disk eccentricity (S11), and the spindle motor starts to turn and rotate the optical disk at a constant velocity, about 2500 rpm (S12).

After the optical disk begins to rotate, only the focusing servo control is activated (S13). While the optical disk rotates preset M revolutions, the maximum amplitude A of the center error signal CE and a counted number N' of traverse signals TS (i.e., the number of zero crossings of signal TS, which is shown in FIG. 5) are measured (S16 and S17). The number N of disk runout is calculated by N=N'/(2M).

The measured maximum amplitude of the center error signal CE and the disk runout N indicate the amount of disk eccentricity. The equation for compensating the distance which the optical pickup should run in consideration of the measured disk eccentricity is expressed as $$F(A')=(A'/A) \times N \quad (1),$$

where A is the amplitude of the center error signal CE measured at the beginning of the track jump operation, A is the amplitude of the maximum center error signal measured during the test mode, and N is the number of disk runout. The equation (1) with value N substituted therein is stored in a memory (S18).

The method of FIG. 8 is as follows: If a user's request is received while reproducing data from the optical disk (S50), the microprocessor 9 sets the track search mode (S51) and calculates the distance which the optical pickup should jump (S52). Using equation (1) stored in the memory, the microprocessor 9 calculates the compensation value corresponding to the amplitude of the current center error signal CE. The distance which the optical pickup should jump is modified by the calculated compensation value to take into account the disk eccentricity. The microprocessor 9 determines the driving voltage according to the modified distance (S54), and then applies the determined voltage to the sled motor to move the optical pickup by the modified distance (S55).

After completing the jump operation, microprocessor 9 detects the present track location and examines if the present track is the desired track (S56). If not, the fine search operation to locate the desired track by moving objective lens 31 is carried out (S59). If the desired track is finally reached, normal data playback begins (S58) after adjusting the rotation velocity of the spindle motor appropriately for the playback (S57).

Figure 9:
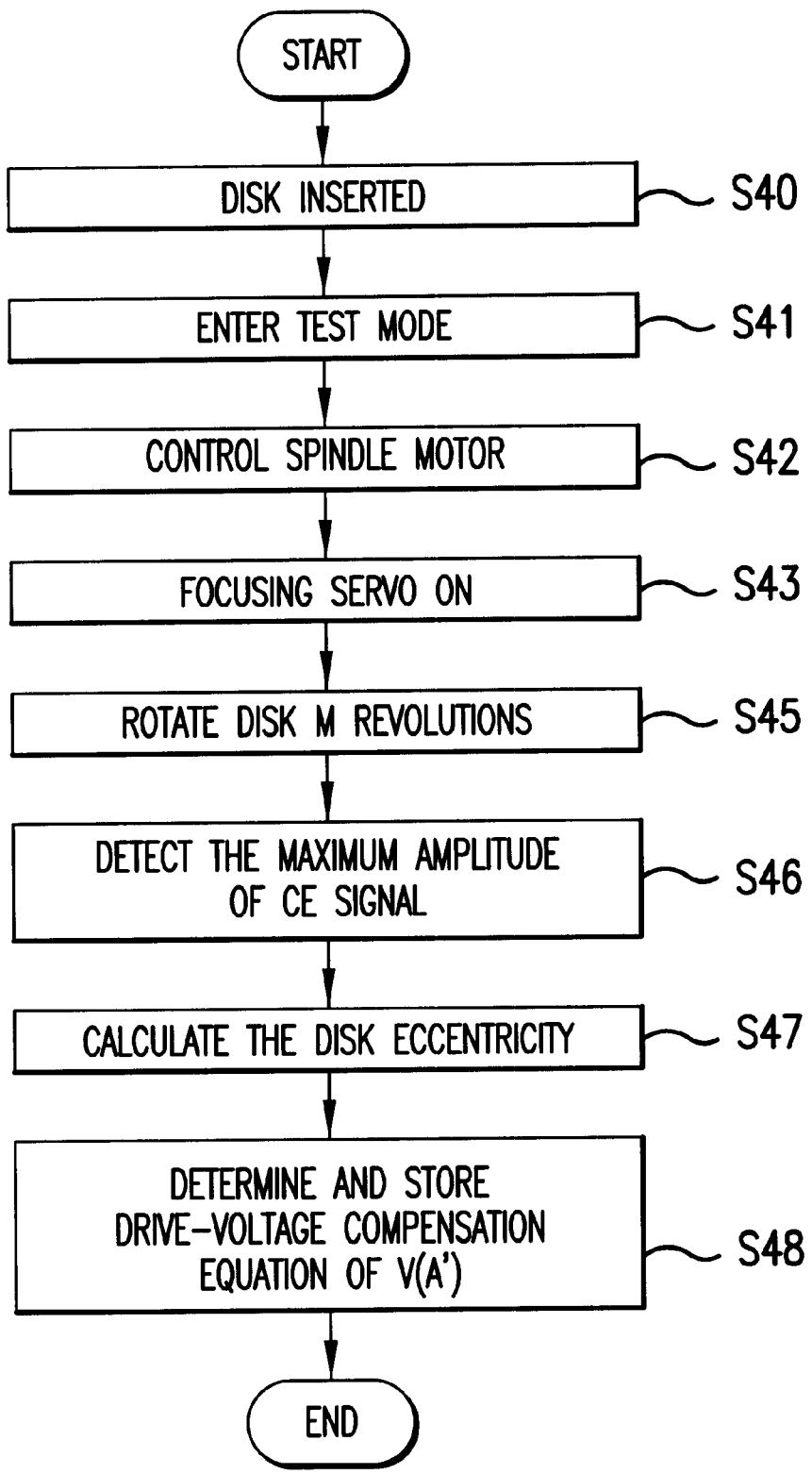
FIG. 9 is a flow diagram of the method for yielding the compensation value corresponding to disk eccentricity according to another embodiment of the present invention.

FIG. 9 is a flow diagram of the method according to another embodiment of the present invention. After measuring the amount of disk eccentricity by completing the steps S40 through S47 which are explained in detail with reference to FIG. 7, microprocessor 9 stores an equation for modifying the drive voltage to be applied to sled motor 12 for moving the optical pickup during the jump operation (S48).

The equation to modify the drive voltage for sled motor 11 is obtained as $$V(A') = (A'/A) \times V_N \qquad (2),$$

where A is the amplitude of the center error signal measured during the track jump operation, A is the amplitude of the center error signal measured during the test mode, and $V_N$ is the motor drive voltage, experimentally determined, to move the optical pickup by the amount of the measured disk eccentricity N.

If a request for a track jump is received while playing back recorded data, microprocessor 9 measures the amount of disk eccentricity and calculates the compensation value corresponding to the measured amount using equation (2). The drive voltage to move optical pickup 2 to the destination track is read out from memory 10. The drive voltage is modified by the compensation value to take into account the disk eccentricity and applied the modified drive voltage to the sled motor. The fine search operation is performed as done in FIG. 8.

After measuring the amount of disk eccentricity, and calculating and saving a compensation value corresponding to the measured disk eccentricity, the compensation value is utilized in the track jump operations, thereby improving track jump performance.

Yet another embodiment of the present invention will be explained in detail with reference to the accompanying drawings.

Figure 10:
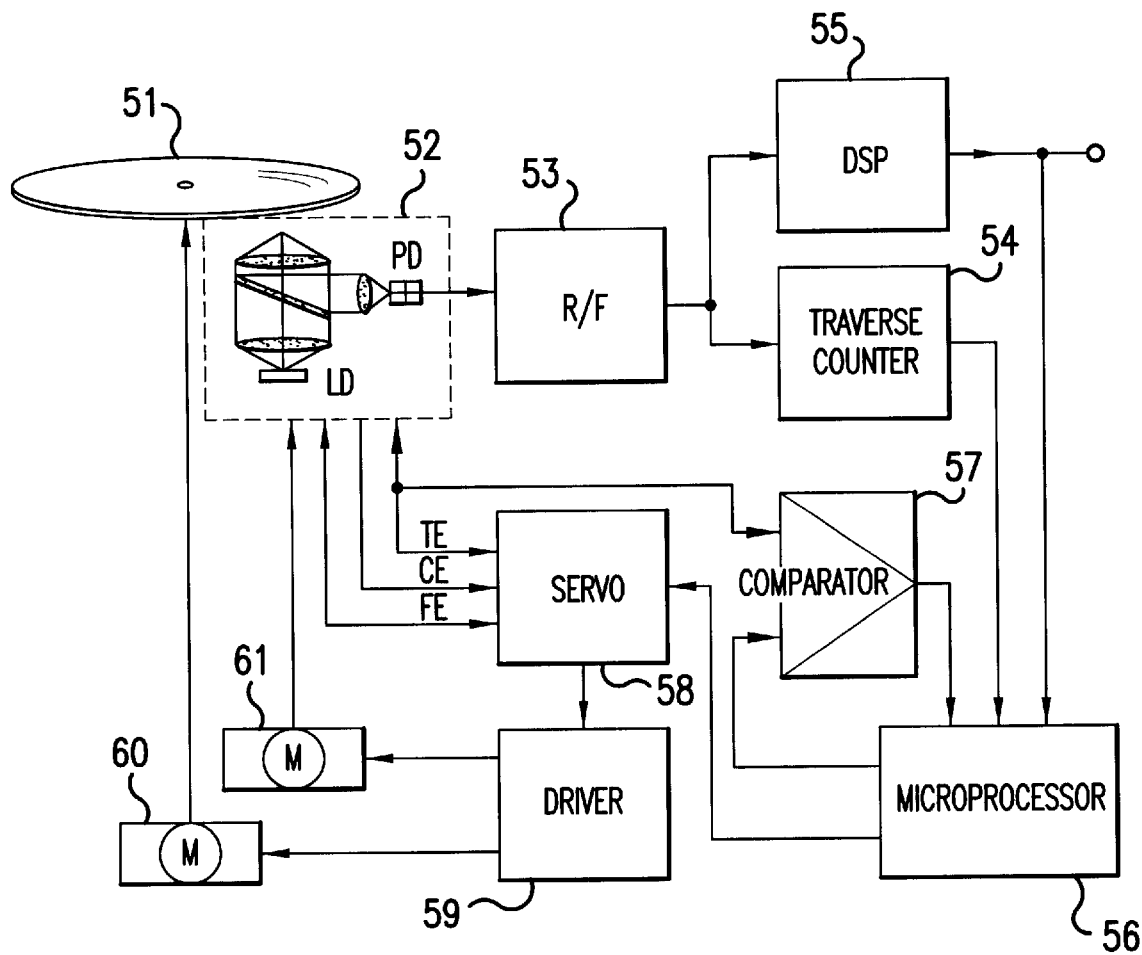
FIG. 10 is a block diagram of an optical disk drive servo control apparatus according to the present invention.

FIG. 10 is a block diagram of a servo control system for an optical disk driver, including a driver 59 driving a spindle motor 60 to rotate an optical disk and a sled motor 11 to move an optical pickup 52 in the radial direction. The optical pickup 52 retrieves digital signals recorded on the optical disk by projecting a laser beam onto the optical disk, collects the laser beam reflected from the optical disk, and converts the collected beam into electric signals. A sled motor 61 moves optical pickup 52 in the radial direction, and a servo unit 58 controls the vertical and radial position of optical pickup 52 with reference to focusing and tracking error signals. The tracking error signal uses a low frequency component of the output from the photodetector PD shown in FIG. 10. An R/F unit 53 equalizes and shapes analog high-frequency signals reproduced by optical pickup 52, and a digital signal processing unit 55 processes binary data outputted from R/F unit 53. A comparator 57 compares the tracking error signal with a reference level, a traverse counter 54 counts the number of traverse signals generated while optical pickup 52 crosses tracks. A microprocessor 56 supervises the overall operation of each component.

Figure 11:
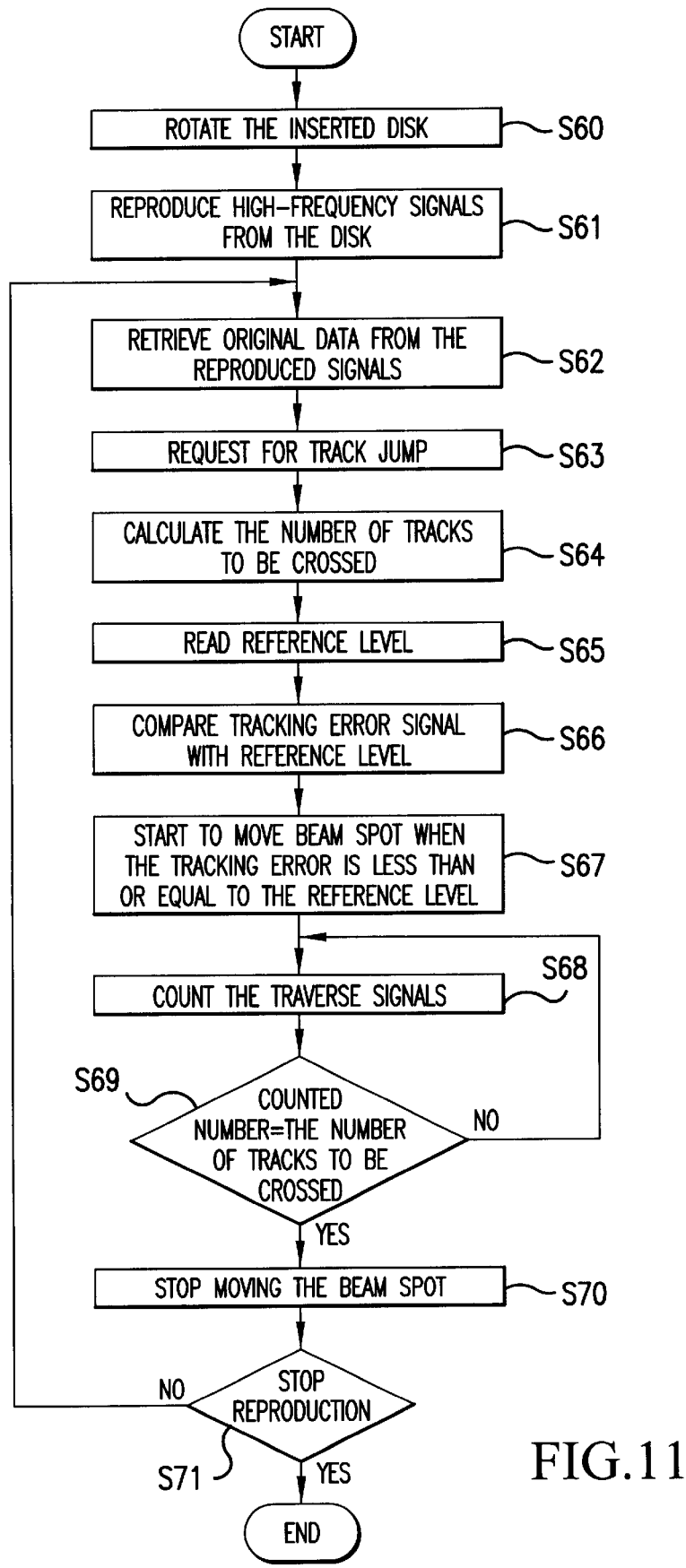
FIG. 11 is a flow diagram of the method for track jump performed in the servo control apparatus according to the present invention.

FIG. 11 is a flow diagram for track jump operations to be practiced in the apparatus shown in FIG. 10. Once an optical disk is inserted, spindle motor 60 starts to rotate the optical disk (S60). When the rotation velocity of the optical disk reaches a steady state, microprocessor 56 maintains the rotation velocity constant and begins track-following control to retrieve the data recorded on the optical disk (S61)

R/F unit 53 equalizes and shapes the high-frequency signals reproduced by optical pickup 52. Digital signal processing unit 55 detects sync signals from the binary stream outputted from R/F unit 53 and sends a GFS (Good Frame Sync) signal to microprocessor 56 if a prescribed number of sync signals are detected. Receiving the GFS signal, microprocessor 56 performs retrieval of digital data (S62).

Figure 12:
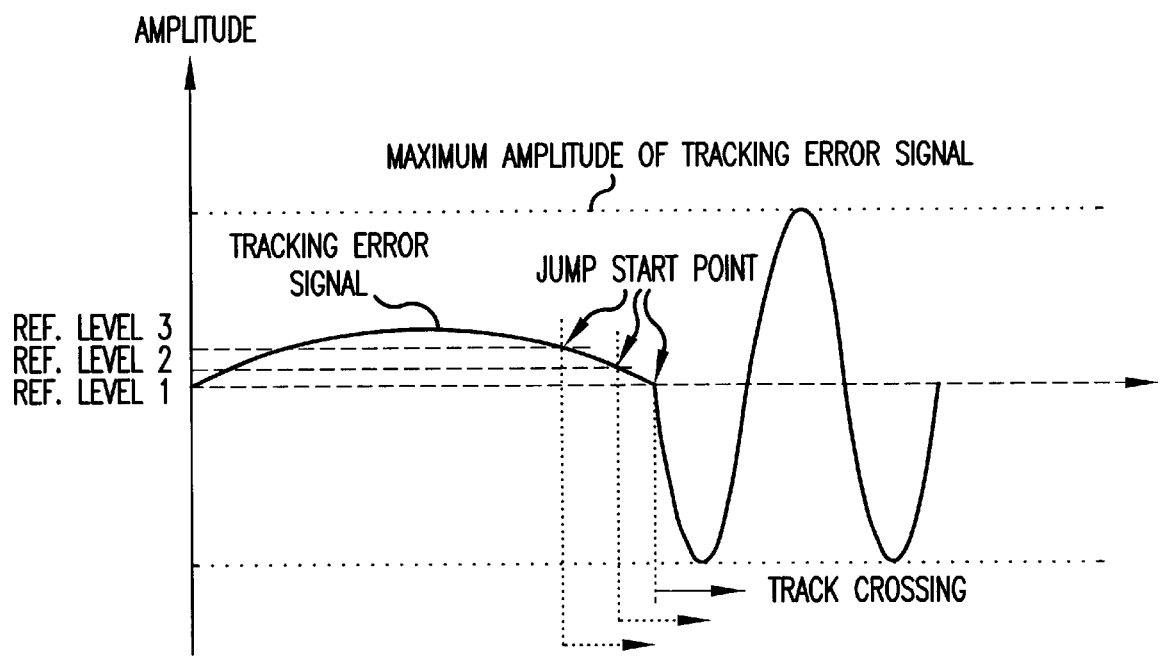
FIG. 12 is an example of the jump pulse dependent upon the number of tracks to be crossed.
Figure 13:
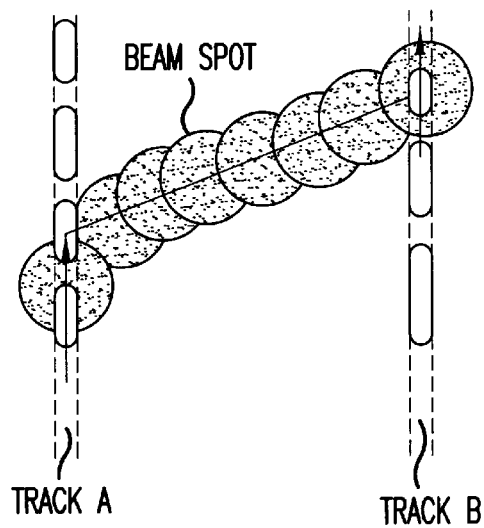
FIG. 13 is a trajectory of the beam spot in the track jump operation.

If a track jump operation is requested (S63), microprocessor 56 calculates the difference M (i.e., number of tracks to be crossed) between the currently accessed track A shown in FIG. 13 and destination track B shown in FIG. 13 (S64) and outputs one of reference levels (i.e., level 1, level 2, level 3, . . . in FIG. 12) to comparator 57. The particular reference level is selected according to the calculated lot difference M. For example, if a distance to be moved is relatively small, level 1 is selected. If the distance to be moved is relatively large, level 3 would be selected.

Comparator 57 compares the reference level received from microprocessor 56 and the tracking error signal. If the tracking error signal is less than or equal to the reference level, i.e., at the "jump start point" marked in FIG. 12, microprocessor 56 issues a track jump command corresponding to the difference M to servo unit 58. Receiving the jump command, servo unit 58 applies a jump pulse to the tracking actuator installed in optical pickup 52 so that the laser beam spot can move from the present track A to the destination track B, along the trajectory shown in FIG. 13 (S67).

The jump operation is carried out by driving both sled motor 61, and the tracking actuator if a long jump is requested, whereas the jump operation is only performed by the tracking actuator if a short jump is requested.

While the track jump operation as shown FIG. 13 is conducted, traverse counter 54 counts the number of traverse signals (S68), which are binary signals generated from the high-frequency signals retrieved by optical pickup 52.

Receiving the counted number of the traverse signals, microprocessor 56 controls servo unit 58 so that the tracking actuator stops exactly at the destination track after jumping the calculated number of tracks, M (S69).

Completing the jump operation (S70), microprocessor 56 resumes retrieval of data from the destination track B (S71).

In the meantime, if a pause command is received, the inward track jump operation is carried out each time the disk rotates one revolution. The jump start point is controlled by varying the reference level, which enables the track-following control to resume, starting from the original position.

The amount of disk eccentricity is measured, and a compensation value corresponding to the measured disk eccentricity is calculated and stored. The stored compensation value is used in the track search mode so that a more stable and precise track search operation is achieved despite the disk eccentricity caused by imperfect disk manufacturing processes or disk clamping errors. Also, when a track jump is requested during a track-following operation, the jump start point is adjusted properly, thereby reducing the time needed to complete the track jump operation as well as reducing track jump errors.

What is claimed is:

1. A method for servo control of an optical disk driver, comprising:

detecting an amount of disk eccentricity based on a variation of a center error of an objective lens detected with a tracking servo control turned off.

2. The method of claim 1, wherein the detecting step obtains the amount of disk eccentricity based on a counted number of traverse signals during a test period with a tracking servo control turned off.

3. A method for servo control of an optical disk driver, comprising:

detecting an amount of misalignment between a center of an objective lens and an optical axis of a photodetector;

calculating a value used to move an optical pickup to a destination track; and adjusting the calculated value based on the detected amount of misalignment.

4. The method of claim 3, further comprising:

conducting a track jump o on using the adjusted value.

5. The method of claim 3, wherein the calculated value is a number of tracks to be crossed.

6. The method of claim 3, wherein the calculated value is a sled motor drive voltage needed to move the optical pickup and the destination track.

7. The method of claim 6, wherein the adjusting step adjusts a gain for the drive voltage to be applied to the sled motor.

8. A method for servo control of an optical disk driver in a track jump operation, comprising:

detecting a tracking error signal from an optical disk;

determining when to move the beam spot based on the tracking error signal;

moving the beam spot when a tracking error signal is less than or equal to a reference level; and setting the reference level based on a number of tracks for the beam spot to cross.

9. An apparatus for servo control of an optical disk driver comprising:

a detector to detect a tracking error signal from an optical disk;

a comparator to compare the detected tracking error signal with a reference level; and a controller to cause an optical pickup to move when the tracking error signal becomes less than or equal to the reference level, wherein said controller sets the reference level based on a number of tracks for the beam spot to cross.

10. The apparatus of claim 9, wherein the tracking error signal includes low-frequency components of an output signal from a photodiode.

11. An apparatus for servo control of an optical disk driver, comprising:

a detector to detect an amount of disk eccentricity from a main beam reflected from an optical disk; and a processor to calculate the total number of tracks to be crossed during a track jump operation and to adjust the total calculated number of tracks based on the detected amount of disk eccentricity.

12. An apparatus for servo control of an optical disk driver, comprising:

a detector to detect an amount of misalignment between a center of an objective lens and an optical axis of a photodetector; and a processor to calculate a value used to move an optical pickup to a destination track and to adjust the calculated value based on the detected amount of misalignment.

13. A method for servo control of an optical disk driver, comprising:

detecting an amount of disk eccentricity from a main beam reflected from an optical disk wherein said detecting obtains an amount of disk eccentricity based on a variation of a center error of an objective lens detected with a tracking servo control turned off;

setting compensation values corresponding to the detected amount of disk eccentricity;

determining a number of tracks to be jumped according to a user selection; and adjusting the number of tracks to be crossed during a track jump operation, based on set compensation values.

14. The method of claim 13, further comprising:

moving an optical pickup over the adjusted number of tracks.

15. The method of claim 13, further comprising: rotating an optical disk at a constant velocity by driving a spindle motor.

* * * * *